INVENTORS
JOHN W. HUTCHINSON
Teh-Yu KAO
LAURENCE C. PENDLEY
BY
W. E. Sherwood
ATTORNEY

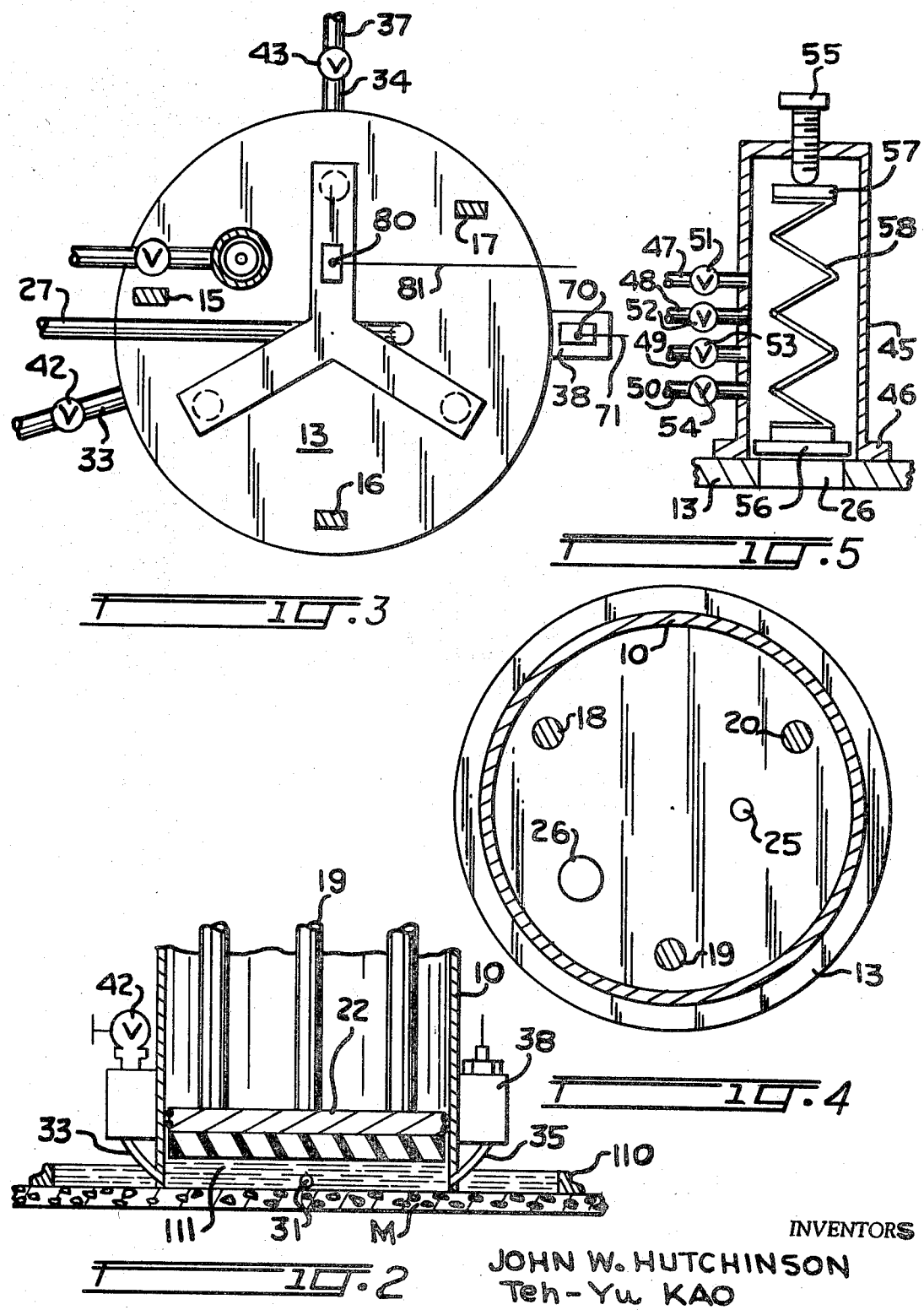

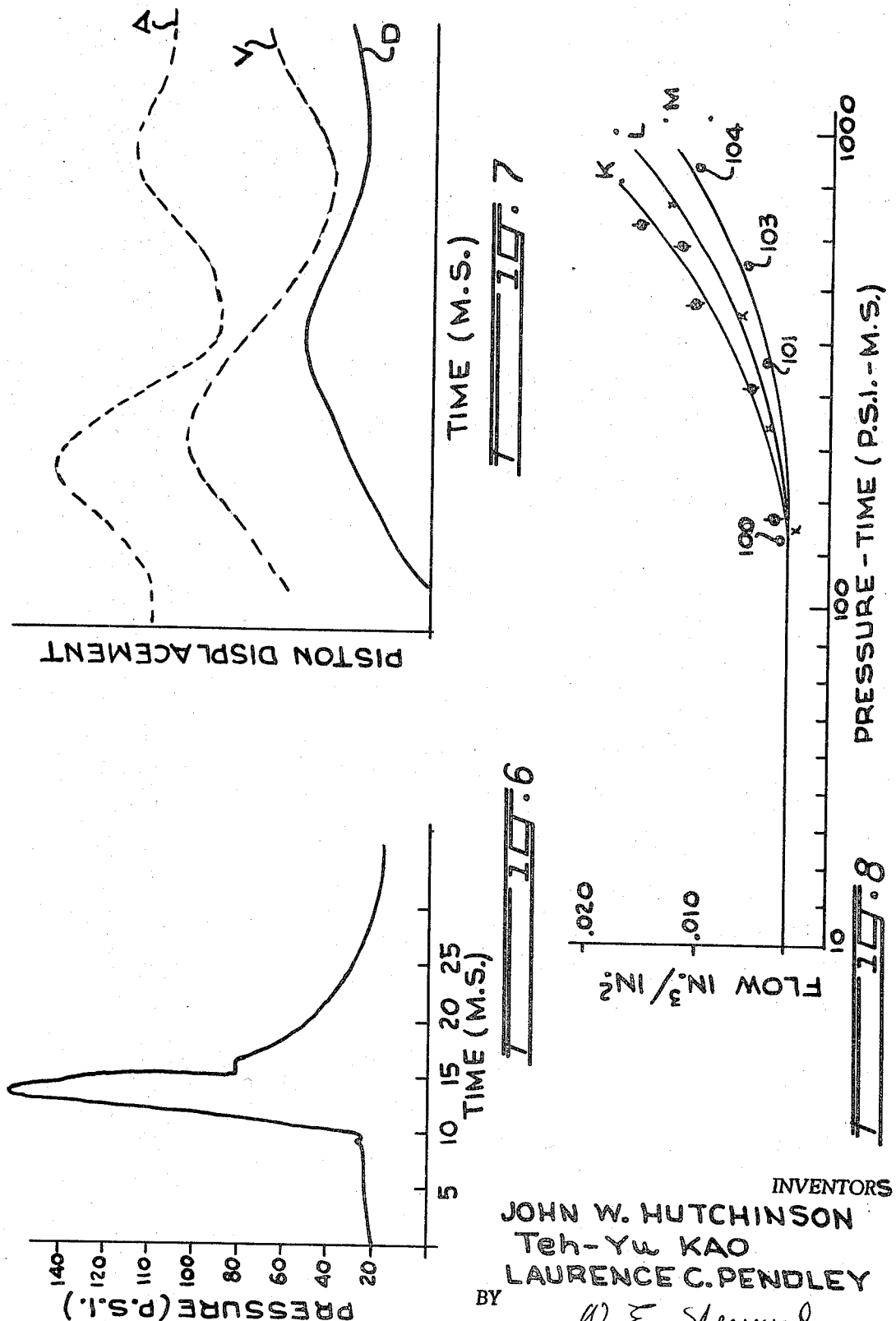

United States Patent Office 3,548,635
Patented Dec. 22, 1970

3,548,635
METHOD OF AND APPARATUS FOR TESTING DYNAMIC PERMEABILITY AND HYDRODYNAMIC SURFACE DRAINAGE OF MATERIALS
John W. Hutchinson, Teh-Yu Kao, and Laurence C. Pendley, Lexington, Ky., assignors, by mesne assignments, to The University of Kentucky Research Foundation, Lexington, Ky., a corporation of Kentucky
Filed Mar. 5, 1969, Ser. No. 804,609
Int. Cl. G01n 15/08
U.S. Cl. 73—38                                    6 Claims

ABSTRACT OF THE DISCLOSURE

A method for determining the hydrodynamic surface drainage characteristic of a material includes confining a body of fluid in contact with the material surface and after applying a quick pressure loading to the body of fluid and gradually releasing that pressure loading, then measuring the amount of fluid lost from the body as an indication of the drainage characteristic of the material. A testing device for carrying out the method in making in situ tests comprises a portable, compact apparatus with a source of gas under pressure for driving a piston against the confined body of fluid, and with means for measuring the volume of confined fluid displaced by the piston and the time during which that displacement occurs.

BACKGROUND OF THE INVENTION

The danger associated with the travel of vehicle tires at high speeds over a wet pavement is receiving careful study by many agencies and certain standards for measuring static permeability characteristics of paving materials have been suggested by the American Society for Testing Materials. Emphasis is generally placed upon the predetermining of skid resistance, or skid numbers, of the pavement involving measuring of the polish resistance of aggregate particles. Moreover, skid resistance in the last analysis depends upon rapid ejection of water at the tire-pavement interface and the faster the tire moves, bearing a given weight and at a given inflation, the greater will be hydrodynamic reduction in the friction factor. Accordingly, a need exists for a method and means for measuring not only the permeability of a pavement, but also its combined hydrodynamic surface drainage characteristics in which dynamic, rather than static permeability is a significant factor.

In the case of an automobile wheel on a highway, or the wheel of an airplane landing on a runway, the hydrodynamic pressure release varies in accordance with many factors among which may be mentioned the flow of water from the tire footprint into the pavement, the flow through the grooves or sipes of the tire tread, the flow between surface aggregate asperities of the pavement, the surface texture of the pavement, the speed of the vehicle, and the pavement permeability value. With tires moving at speeds above 40 m.p.h., for example, the inertia of the water layer on a wet highway causes a rapid build-up of stagnation pressure which frequently results in the well-known and dangerous hydroplaning behavior of the vehicle.

In contrast with the known methods of determining the suitability of paving materials by static permeability testing in order to overcome problems of the type above indicated, the present invention relates to the measuring of the hydrodynamic surface drainage characteristic of such materials, including their permeability, by dynamic testing procedures. While the invention is particularly suited for testing paving materials, in its broader aspects, however, it is well suited for testing other materials such as coatings, materials treated with impregnating fluids, and the like. Moreover, it is suited for determining the dynamic permeability of materials apart from the determination of the entire hydrodynamic surface drainage characteristic of such materials.

SUMMARY

A testing apparatus suitable for carrying out the method of determining dynamic permeability values of a material or the method for determining the hydrodynamic surface drainage characteristic of the material includes a cylinder having a movable piston therein adapted to be driven toward the material surface by a predetermined volume of expansible first fluid supplied to the cylinder within a few milliseconds. The cylinder confines a predetermined amount of a second fluid below the piston and in contact with the material under test, prior to introduction of the first fluid.

The amount of second fluid displaced from the cylinder is calculated as a function of the piston displacement indicated by an accelerometer travelling with the piston. A pressure transducer in communication with the second fluid during movement of the piston indicates the magnitude and time of application of the pressure serving to force the second liquid from the cylinder. The data indicated by the accelerometer and pressure transducer are displayed upon a recording oscilloscope and provide the information from which calculations may be made and charts prepared showing the dynamic permeability and/or the hydrodynamic surface drainage values of the material tested.

Among the objects of the invention are the provision of a method for determining the dynamic permeability value of a material with respect to water or to air; a method for determining the hydrodynamic surface drainage characteristic of a material; a testing apparatus adapted selectively for determining either the dynamic permeability value or the hydrodynamic surface drainage characteristic of a material; a testing apparatus which is compact, portable, and suitable for in situ testing of surfaces such as highway paving; and a testing apparatus which can be readily calibrated and will provide reliable test results during use.

These and other objects and advantages of the invention will become more apparent as the description proceeds and when considered in conjunction with the accompanying drawings in which:

FIG. 2 is a schematic view showing a portion of the apparatus of FIG. 1 as employed in the determination of the hydrodynamic surface drainage characteristic of a pavement in situ.

FIG. 3 is a top plan view of the test device as taken on line 3—3 of FIG. 1 showing the actual location of the piston rods.

FIG. 4 is a sectional view taken on line 4—4 of FIG. 1 and showing the actual location of the piston rods.

FIG. 5 is a vertical sectional view of the adjustable valve for regulating the rate of pressure loading release.

FIG. 6 is a view of a typical pressure-time trace shown on the recording oscilloscope.

FIG. 7 is a view of a typical piston displacement trace shown on the recording oscilloscope and with traces of the acceleration and velocity of the piston corresponding thereto being indicated by dotted lines, and FIG. 8 is a graph showing plotted values of the relative dynamic permeabilities of a series of materials employing data secured in accordance with the practice of the invention.

Figure 1:
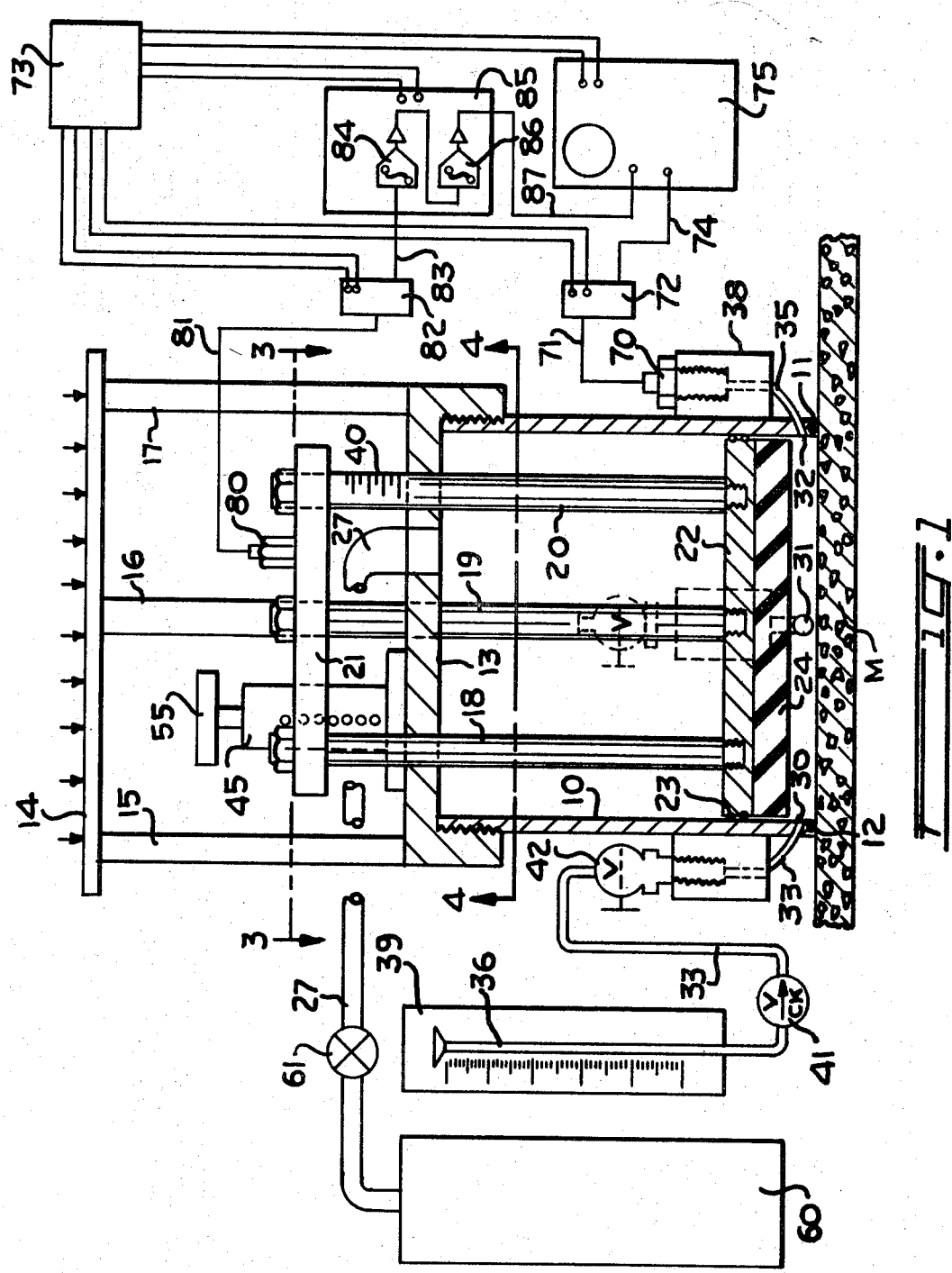
FIG. 1 is a schematic view showing one form of apparatus and associated equipment for determining the dynamic permeability value of a paving material.

Referring now to FIG. 1, a suitable test device for carrying out the method of the invention includes a short metallic cylinder, for example, about eight inches in diameter and about eight inches in height, having a circular wall 10 with its lower annular face 11 in a plane normal to the cylinder axis. This face is recessed to retain a compressible ring seal 12 which contacts the surface of a material under test when determining the dynamic permeability thereof, but which generally is removed when determining the hydrodynamic surface drainage characteristic of such material. The upper end of the cylinder is closed by means of a detachable, apertured cover 13 of sufficient strength to support a restraining surcharge exerted by a member 14 and transmitted to that cover by one or more spaced legs as indicated at 15, 16, 17.

Extending through the cover with a close fit are three equally spaced rods 18, 19, 20 attached at their upper ends to a yoke 21 and at their lower end to a piston 22 having a seal 23 engageable with the inner circumference of the cylinder. A suitable facing 24 is attached to the lower surface of the piston and when the apparatus is employed in calculating the skid resistance of pavements such facing material will generally be rubber, thus to simulate the interface of a tire with a wet road.

The undersurface of the cover as shown in FIG. 4, includes openings 25 and 26 for communicating respectively the space within the cylinder above the piston with a conduit 27 leading to a source of a first fluid under pressure, and for communication with an adjustable valve for regulating the escape of such fluid from the cylinder. Adjacent the lower end of the cylinder apertures 30, 31, and 32 extend through the wall and communicate respectively with conduits 33, 34 and 35 leading respectively to a manometer 36, a vent 37, and a housing 38 for a pressure transducer. The manometer including a scale 39 is generally employed only for calibration purposes in conjunction with a scale 40 conveniently located on one of the rods 20 above the cover of the cylinder, and in connection therewith a conventional check valve 41 and a conventional shut-off valve 42 are incorporated in the conduit 33. A conventional shut-off valve 43 also is located in conduit 34 leading to the vent.

Various forms of relief valves may be employed for regulating the rate of pressure loading release corresponding to the pressure duration on the piston, but we prefer to employ a valve such as indicated in FIG. 5 and including a housing 45 having a flange 46 for attachment to the outer face of cover 13 and with the interior of the housing communicating with the interior of the cylinder through the aperture 26. A series of vents 47 to 50 each independently controlled by a respective valve 51 to 54 are arranged along the housing at varying distances from the cover and at its upper end the housing is provided with an axially movable screw 55 adjustable through the cover of the housing and from the exterior of that housing. Disposed within the housing adjacent the flange 46 is a floating plate 56 and disposed within the housing in contact with the lower end of the screw is another floating plate 57, a compression spring 58 serving to hold the two plates apart.

Various sources of an expansible fluid for actuating the piston of the above-described test device may be employed, as for example an explosive means such as a shotgun shell, or, as preferred, a tank 60 of gas, such as nitrogen, under suitable pressure. For example, suitable pressures may be within the range of 18 p.s.i.g. to 225 p.s.i.g. When employing fluid from tank 60, a conventional rapidly operated valve 61, which for example may be a solenoid-operated rotary valve, is located in conduit 27. In any event, it is a feature of the invention that such fluid is introduced in a predetermined volume into the space above the piston substantially instantaneously, as for example in a time period of not more than about 15 milliseconds. As used herein this piston-propelling fluid is called the first fluid.

When such fluid enters the cylinder, it becomes necessary to have ready some means for indicating both the amount of displacement of the piston and simultaneously the consecutive pressure values exerted by that piston on a second fluid beneath the piston with respect to time. For indicating the latter, we provide a conventional pressure transducer 70 such as the Kistler Model 603 piezoelectric transducer which through conductor 71 feeds a signal to a Kistler Universal Dial Calibration Model 503 charge amplifier 72 suitably connected to a power source 73 which may be 110 volt, single phase, 60 cycle. The amplified signal from the amplifier is then fed by conductor 74 to a Tektronix Type 564 four beam storage oscilloscope 75 likewise suitably connected to power source 73.

For indicating the piston displacement a conventional accelerometer 80, for example, of the piezo-electric type, is rigidly mounted upon yoke 21 and through a conductor 81 feeds a signal to a similar charge amplifier 82 suitably connected to power source 73. This amplifier in turn feeds the amplified acceleration signal A through conductor 83 to the initial stage 84 of a Double Integrator 85 of the type No. 0, available from Tektronix, Inc., and which likewise is suitably connected to power source 73. The signal V representing velocity of the moving piston is then fed to the second stage 86 of the integrator. Following this integration a signal representing piston displacement is then fed through conductor 87 to the oscilloscope and appears on the screen as trace D.

Having available an apparatus as above described the method of the invention may be practiced in the following manner. The second fluid beneath piston facing 24 may without departing from the invention be air, as when air permeability values are needed, but more generally will be water as hereinafter disclosed. In either event, the facing 24 will be of an elastomer material and will undergo a reduction in volume as the piston is driven against the second fluid, this reduction being the more noticeable when the inertia and noncompressibility of water is taken into account. Accordingly, the apparatus requires calibrating before the traces appearing in the oscilloscope are to be used as a basis for calculations. The initial calibration of the apparatus normally is performed under laboratory conditions and at the start may comprise using a material M as shown in FIG. 1 with the seals 12 compressed thereagainst and with the facing 24 closely adjacent the surface of that material. With valves 42 and 43 open, with transducer 70 removed, and with the manometer 36 filled with water, the piston is slowly lifted until a standard mark on scale 40 coincides with the top of cover 13. During this movement, water flows into the space below the piston and fills conduits 33, 34, and 35. The reading on the manometer scale is then noted and valves 42, 43 are closed and the transducer fixed in place. Relief valve 45 is adjusted to vent through a selected outlet or outlets, the corresponding valve or valves for such outlet or outlets being opened. Thereafter, valve 61 is opened and promptly closed to admit a predetermined amount of pressure fluid at a predetermined initial pressure into the cylinder. As piston 22 is driven downwardly the water therebeneath is forced into material M; a pressure-time trace of the type indicated in FIG. 6 meanwhile appearing on the oscilloscope screen; and a displacement trace D of the type shown in FIG. 7 likewise appearing simultaneously on that screen. The abscissa of each of FIGS. 6 and 7, of course, represent time intervals generally measured in milliseconds and known from the electrical circuitry, and the ordinate of FIG. 6 represents pressures generally measured in p.s.i. and known from the signal given by the transducer. However, until the apparatus is first calibrated, the ordinate of FIG. 7, generally measured in fractions of an inch, remains indeterminate.

Having thus secured an initial record of displacement trace D, valve 42 is opened and the piston is again raised to the standard mark on scale 40. As this occurs, water is withdrawn from the manometer to fill the vacuum beneath the piston and when flow ceases the new reading on the scale 39 is taken. By calculation the difference between the first and second readings on the manometer scale indicate the extent of the previous movement of the piston compensated for the behavior of the elastomer facing 24 and thus provide for establishing the ordinate markings of FIG. 7 to be used for signals later to be found on the oscilloscope screen during further testing.

As will be apparent, the described operation of calibration has also provided a determination of the dynamic permeability of material M corresponding to the one set of conditions under which the material was tested and for example may be considered as representing the calculated valve 100 on the chart shown in FIG. 8. Values expressed on this chart are derived as follows; the abscissa constitutes the integrated value of the area beneath the trace noted in FIG. 6 and the ordinates are calculated from the integrated value of the area below trace D of FIG. 7, representing loss of water into material M within the confines of the cylinder.

After once having calibrated the apparatus, the manometer and the section of conduit 33 upstream of valve 42 may be removed and in subsequent testing the water may be introduced directly into valve 42. In order to secure a reliable measurement of the dynamic permeability of a given material and particularly when that material is to be compared with other materials, a series of separate tests are made upon the same surface area of the material and with variations of the time period during which the pressure is applied to the water beneath the piston. These variations may conveniently be obtained merely by changing the setting of the relief valve or valves and while using the same source of the pressure fluid from tank 60. Since the relationship between pressure magnitude and pressure duration is varied depending upon which of the vents from the release valve are opened after the floating plate 56 is raised to uncover such vent, it thus is possible to substantially duplicate any dynamic loading and load release rate which would result at the footprint interface of a tire with a wet highway surface. In any event, however, the application of pressure loading to the piston will not exceed about 45 milliseconds in the practice of the invention. For example, by repeating the above described test and with the relief valve set to vent through outlet 49, a second calculated value 101 for material M could be obtained. Venting through outlets 48 and 47 respectively, may result in calculated values 102 and 103. With a sufficient number of such values a curve such as M may then be drawn representing the dynamic permeability of the material and indicating the expected behavior of a vehicle whose tires are moving over a wet pavement comprised of such a material. As will be apparent, the abscissa of FIG. 8 are directly related to the speed of such a vehicle, the weight borne by its tires, and the inflation of such tires. Moreover, the greater the water flow as indicated by the ordinate of FIG. 8 the less likely will be the dangerous hydroplaning effect experienced by such a vehicle. Thus as materials represented by the curves K, L and M, material K would be the safest in this respect.

As mentioned earlier however, the total hydrodynamic surface drainage of a material rather than its dynamic permeability value alone, affords the best estimate of its suitability as a paving material, and for determining this drainage characteristic the method of the invention may be practiced as follows. The calibrated apparatus with its electrical components and supply 60 of first fluid may be transported by truck to a testing site for material M already installed or in use, and the weight of such truck may conveniently serve as the restraining surcharge indicated by member 14. As disclosed in FIG. 2, a circular dam 110 is fitted around the test area for the material and the test device, with seal 12 removed therefrom is installed in place with the annular face of the cylinder in contact with a material surface as actually presented to a vehicle tire. Thus the surface texture, the surface asperities, and the inherent permeability of material M, all of which influence hydrodynamic surface drainage, will be reflected in the test results.

A suitable quantity of water is then poured within the confines of dam 110 and the testing device is arranged therein to enclose an air-free volume of water 111 beneath the piston and with the piston position corresponding to the standard mark on scale 40 and with the relief valve set at the desired opening. The predetermined volume of the first fluid under pressure is then supplied to the cylinder and as the piston is actuated, the volume of water 111 is reduced not only by the loss due to the above-described permeability, but also by passage of water under the edge of wall 10 and into the surrounding bath due to the surface asperities and the texture of material M. The corresponding trace D then shown on the oscilloscope and the chart later prepared therefrom will represent with improved fidelity the actual hydrodynamic surface drainage characteristic of the tested material, and will provide a better test for the material than is now possible by following the ASTM methods. In general, in the practice of the present invention factors associated with water inertia and flow velocities, such as found to result in hydroplaning of a vehicle tire, are determined in the testing of the material with greater fidelity than can be secured with present static permeability testing.

In view of the above disclosure, it will be noted that the several objectives of the invention are achieved and other advantageous results obtained.

What is claimed is:

1. The method of determining the hydrodynamic surface drainage characteristic of a material including providing a bath of fluid in contact with a substantially flat surface of the material to be tested, rigidly holding the annular end of a cylinder in contact with said surface and within said bath, providing a confined body of fluid from said bath within said cylinder, subjecting said confined body of fluid to a substantially instantaneous pressure loading serving to force said confined body of fluid into said material and under said annular end of said cylinder, gradually releasing the pressure loading upon said confined body of fluid, and measuring the quantity of fluid removed from said confined body during the application of said pressure thereto as an indication of the hydrodynamic surface drainage characteristic of said material.

2. A device for testing materials comprising a cylinder having an annular face at one end and adapted to contact a generally flat surface of the material under test, a piston within said cylinder, a cover closing the opposite end of said cylinder and providing a space above said piston, means for guiding said piston in its movement within said cylinder, means for introducing a predetermined volume of an expansible first fluid under pressure substantially instantaneously into said space thereby to drive said piston toward said material surface, means for rigidly holding said annular face in sealed contact with said surface during the test, means for releasing said first fluid from said space, means for confining a predetermined volume of a second fluid between said piston and said surface prior to introducing said first fluid into said space, means for indicating the amount of displacement of said piston under pressure of said first fluid thereby to provide a first measurement of displaced volume of said second fluid into said material as a consequence of its permeability, and means for indicating the consecutive pressure values in said second fluid with respect to time during displacement of said piston thereby to provide a second measurement of the amount and duration of the forces necessary to cause said displaced volume of said second fluid to enter into said material, said first and said second measurements jointly serving to establish the dynamic permeability value of said material.

3. A device as defined in claim 2 including a facing of an elastomeric material attached to said piston and in contact with said second fluid whereby said dynamic permeability value approximates the value representative of a vehicle tire formed of said elastomeric material moving over a pavement formed of said material under test and covered with said second fluid.

4. A device as defined in claim 2 wherein said means for indicating the amount of displacement of said piston includes an accelerometer mounted for movement with said piston.

5. A device as defined in claim 2 wherein said means for indicating pressure values in said second fluid includes a pressure transducer having a conduit filled with said second fluid.

6. A device for testing materials comprising a cylinder having an annular face at one end and adapted to contact a generally flat surface of the material under test, a piston within said cylinder, a cover closing the opposite end of said cylinder and providing a space above said piston, means for guiding said piston in its movement within said cylinder, means for introducing a predetermined volume of an expansible first fluid under pressure substantially instantaneously into said space thereby to drive said piston toward said material surface, means for rigidly holding said annular face in contact with said surface during the test, means for releasing said first fluid from said space, means for confining a predetermined volume of a second fluid between said piston and said surface prior to introducing said first fluid into said space, means for indicating the amount of displacement of said piston under pressure of said first fluid thereby to provide a first measurement of displaced volume of said second fluid jointly entering into said material and escaping between the annular face of said cylinder and the surface of said material, and means for indicating the consecutive pressure values in said second fluid with respect to time during displacement of said piston thereby to provide a second measurement of the amount and duration of the forces necessary to cause said displaced volume of said second fluid to leave the cylinder, said first and said second measurement jointly serving to establish the hydrodynamic surface drainage characteristic of said material.

References Cited

UNITED STATES PATENTS

| | | | |
|---|---|---|---|
| 3,158,020 | 11/1964 | Donaldson | 73—38 |
| 3,435,663 | 4/1969 | Lamballerie | 73—38 |

LOUIS R. PRINCE, Primary Examiner

W. A. HENRY II, Assistant Examiner